UNITED STATES PATENT OFFICE.

WILLIAM R. WALKER, OF NEW YORK, N. Y.

MANUFACTURE OF STEEL.

13,538. Specification of Reissued Letters Patent. Reissued Feb. 25, 1913.

No Drawing. Original No. 1,014,425, dated January 9, 1912, Serial No. 502,865. Application for reissue filed December 30, 1912. Serial No. 739,414.

*To all whom it may concern:*

Be it known that I, WILLIAM R. WALKER, a resident of New York, in the county of New York and State of New York, have invented an Improvement in the Manufacture of Steel, of which the following is a specification.

In the practice of my invention, I introduce molten pig metal into a Bessemer converter and blow it therein until the silicon has been eliminated and the carbon reduced to a definite percentage, preferably to about 05 per cent., which percentage can be gaged with accuracy because it is about the percentage contained in the metal at the time when the flame "drops," a phenomenon which is well known and readily recognized by the skilled blower. I then add to the desiliconized and substantially decarburized metal a proportion of carbon sufficient to raise its carbon content to a definite percentage, preferably to about .3 per cent., though this percentage may be varied. The carbon addition is preferably made by adding to the Bessemer metal in the ladle, pig iron either in the form of cold pig or molten pig, and as the percentage of carbon of the Bessemer metal is substantially constant, the amount of pig metal to be added in the ladle can be readily determined with substantial precision. The carbon may be introduced by adding anthracite coal or powdered coke to the metal instead of adding carbon in the form of pig iron. If pig iron is added, it is preferably in the molten condition. The metal thus enriched in carbon is then charged into an electrically heated furnace where it is treated preferably with basic additions for removal of sulfur and phosphorus, and for increase of its heat to bring it into refined and heated condition proper for casting into the ingot molds.

The importance of adding carbon to the blown metal before introducing it into the electric furnace is that in this way the loss by skulling is lessened, and by bringing the metal to a definite carbon content the heats in the electric furnace are made uniform in character and duration, the product rendered more uniform and the manufacture greatly facilitated.

As the decarburized metal is low in carbon when taken from the converter and is often transferred a considerable distance to the electric furnace, a considerable amount of this metal will solidify in the ladle and form skulls therein. This skulling action will reduce the amount of metal poured into the electric furnace from the ladle, and as the skulling action will vary, the amount poured in will vary. By adding carbon to the metal before its being carried to the electric furnace, I raise its carbon content and thus lower its melting point, and hence prevent or greatly lessen the amount of skulling during the transfer to the electric furnace. This, therefore, makes the charges more uniform in amount as poured into the electric furnace.

The obtaining of a uniform carbon content is rendered easy by adding carbon to the blown metal rather than by attempting to stop the blow at the desired point, for to determine the point of stopping before the flame drops is very difficult, while to add the necessary percentage of carbon to the bath depleted of carbon is easy.

I am aware that it is old to eliminate practically all of the carbon from steel before recarburizing and do not desire to claim this, but I do desire to claim the recarburizing prior to transferring the metal to the electric furnace.

The best percentage of carbon to be added will be governed somewhat by the period of time during which the metal is to be held in the ladle before pouring into the electric furnace, being greater as the time is longer.

I claim:

1. In the manufacture of steel, the steps consisting of removing the carbon of pig iron to a substantially definite percentage, then recarburizing to a sufficient extent to lessen skulling during transfer, and then transferring the metal to and treating it in an electric furnace.

2. In the manufacture of steel, the steps consisting in bessemerizing pig iron, reducing its carbon to a substantially definite percentage, then adding carbon to a sufficient extent to lessen skulling during transfer, and then transferring the metal to and treating it in an electric furnace.

3. In the manufacture of steel, the steps consisting of bessemerizing pig iron to a point where the flame drops, then removing the metal from the converter, adding carbon thereto to a sufficient extent to lessen skulling during transfer, and transferring the metal to and treating it in an electric furnace.

In testimony whereof, I have hereunto set my hand this 18th day of December, 1912.

WILLIAM R. WALKER.

Witnesses:

D. ANTHONY USINA,

LULU STUBENVOLL.